US012290798B2

(12) United States Patent
Colmenares et al.

(10) Patent No.: US 12,290,798 B2
(45) Date of Patent: May 6, 2025

(54) METHOD FOR OBTAINING METAL OXIDES SUPPORTED ON MESOPOROUS SILICA PARTICLES

(71) Applicant: TECHNISCHE UNIVERSITÄT BERLIN, Berlin (DE)

(72) Inventors: Maria Colmenares, Berlin (DE); Tomos Harris, Berlin (DE); Julien Sialelli, Berlin (DE); Javier Silva Mora, Berlin (DE); Arne Thomas, Dallgow-Döberitz (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 804 days.

(21) Appl. No.: 17/609,339

(22) PCT Filed: May 7, 2020

(86) PCT No.: PCT/EP2020/062719
§ 371 (c)(1),
(2) Date: Nov. 5, 2021

(87) PCT Pub. No.: WO2020/225366
PCT Pub. Date: Nov. 12, 2020

(65) Prior Publication Data
US 2022/0161240 A1 May 26, 2022

(30) Foreign Application Priority Data
May 8, 2019 (EP) .................................... 19173277

(51) Int. Cl.
*B01J 21/08* (2006.01)
*B01J 29/03* (2006.01)
(Continued)

(52) U.S. Cl.
CPC ....... *B01J 29/0333* (2013.01); *B01J 29/0316* (2013.01); *B01J 29/0341* (2013.01);
(Continued)

(58) Field of Classification Search
CPC .... B01J 21/08; B01J 29/0308; B01J 29/0316; B01J 29/0333; B01J 29/0341;
(Continued)

(56) References Cited

U.S. PATENT DOCUMENTS 6,800,266 B2 * 10/2004 Pinnavaia ............... C01B 37/02
423/328.1
8,216,961 B2 * 7/2012 Lee ...................... B01J 23/8906
977/773
(Continued)

FOREIGN PATENT DOCUMENTS

| CN | 101007624 A | 8/2007 |
|---|---|---|
| CN | 101391753 A | 3/2009 |

(Continued)

OTHER PUBLICATIONS

Ahmed, R. et al. "Preparation and structural characterisation of SBA-15 supported nickel catalysts via sol-gel nickel oxide coatings for dry reforming of methane." In WIT Transactions on Engineering Sciences, WIT Press, Dec. 2012; vol. 81, pp. 71-82.
(Continued)

*Primary Examiner* — Cam N. Nguyen
(74) *Attorney, Agent, or Firm* — Maschoff Brennan

(57) ABSTRACT

A method for obtaining metal oxides supported on mesoporous silica particles includes a) providing a solution of at least one metal salt, b) providing a solution of at least one template forming agent of the general formula (I) $Y_3Si(CH_2)_n$—X (I), wherein X is a complexing functional group; Y is —OH or a hydrolysable moiety selected from the group containing halogen, alkoxy, aryloxy, acyloxy, c) mixing the
(Continued)

metal salt solution and the complex forming agent solution to obtain a metal precursor; d) adding at least one solution containing at least one pore structure directing agent to the metal precursor to obtain a metal precursor template mixture; e) adding at least one alkali silicate solution to the metal precursor template mixture at room temperature to obtain a silica-supported metal complex; and f) calcination of the silica-supported metal complex under air to obtain the supported metal oxide mesoporous silica particles.

15 Claims, 4 Drawing Sheets

(51) Int. Cl.

| | |
|---|---|
| B01J 37/00 | (2006.01) |
| B01J 37/04 | (2006.01) |
| B01J 37/06 | (2006.01) |
| B01J 37/08 | (2006.01) |
| B01J 37/10 | (2006.01) |
| B01J 37/34 | (2006.01) |
| C01B 33/18 | (2006.01) |
| C01B 33/193 | (2006.01) |
| C01B 39/02 | (2006.01) |
| C01B 39/06 | (2006.01) |
| C01B 39/08 | (2006.01) |

(52) U.S. Cl.
CPC .............. *B01J 37/04* (2013.01); *B01J 37/082* (2013.01); *C01B 39/02* (2013.01); *C01B 39/06* (2013.01); *C01B 39/08* (2013.01); *B01J 2229/18* (2013.01)

(58) Field of Classification Search
CPC ...... B01J 37/009; B01J 37/0018; B01J 37/04; B01J 37/06; B01J 37/082; B01J 37/10; B01J 37/343; C01B 39/02; C01B 39/06; C01B 39/08; C01B 33/18; C01B 33/193
See application file for complete search history.

(56) References Cited

U.S. PATENT DOCUMENTS

| | | | |
|---|---|---|---|
| 8,226,740 B2* | 7/2012 | Chaumonnot | C01B 39/04 502/64 |
| 8,415,267 B2* | 4/2013 | Lee | B01J 23/52 977/773 |
| 8,993,052 B2 | 3/2015 | Chen et al. | |
| 10,265,685 B2* | 4/2019 | Pereira Almao | B01J 35/647 |
| 2005/0164870 A1* | 7/2005 | Shan | C01B 37/02 502/64 |
| 2007/0227351 A1 | 10/2007 | Garcia-Martinez | |
| 2009/0036297 A1* | 2/2009 | Crudden | B01J 20/28011 502/158 |
| 2011/0171121 A1 | 7/2011 | Senderov et al. | |
| 2012/0157735 A1* | 6/2012 | Bao | B01J 29/076 502/64 |
| 2012/0275993 A1 | 11/2012 | Olson | |
| 2015/0105241 A1* | 4/2015 | Roman-Leshkov | H01M 4/362 502/200 |

FOREIGN PATENT DOCUMENTS

| | | |
|---|---|---|
| CN | 103058286 A | 4/2013 |
| CN | 103180920 A | 6/2013 |
| CN | 104445321 A | 3/2015 |
| CN | 104569075 A | 4/2015 |
| CN | 105084372 A | 11/2015 |
| CN | 105727984 A | 7/2016 |
| CN | 105731550 A | 7/2016 |
| CN | 106362738 A | 2/2017 |
| CN | 107638880 A | 1/2018 |
| EP | 3517500 A1 | 7/2019 |
| WO | 2014125309 A2 | 8/2014 |
| WO | 2017121792 A1 | 7/2017 |

OTHER PUBLICATIONS

Arora, S. and Prasad, R. "An overview on dry reforming of methane: strategies to reduce carbonaceous deactivation of catalysts." RSC Adv. 6 (Oct. 21, 2016) 108668-108688.

Baktash, E. et al. "Controlled Formation of Nickel Oxide Nanoparticles on Mesoporous Silica using Molecular Ni4O4 Clusters as Precursors: Enhanced Catalytic Performance for Dry Reforming of Methane." ChemCatChem 7 (Apr. 2015) 1280-1284.

Bhosale, M. A. and Bhanage, B. M. "Rapid synthesis of nickel oxide nanorods and its applications in catalysis." Adv. Powder Technol. (Dec. 2014), http://dx.doi.org/10.1016/j.apt.2014.11.015.

Budroni, G. and Corma, A. "Gold-Organic-Inorganic High-Surface-Area Materials u Precursors of Highly Active Catalysts." Angew. Chemie Int. Ed. 45 (Sep. 2006) 3328-3331.

Calles, J. et al. "Ce and La modification of mesoporous Cu—Ni/SBA-15 catalysts for hydrogen production through ethanol steam reforming." Microporous Mesoporous Mater. 119 (Mar. 2009) 200-207.

Colmenares, M. et al. "Oxidative coupling of methane on the Na2WO4-MnxOy catalyst: COK-12 as an inexpensive alternative to SBA-15." Catal Commun. 85 (Jun. 26, 2016) 75-78.

Colmenares, M. et al. "Batch and continuous synthesis upscaling of powder and monolithic ordered mesoporous silica COK-12," Microporous and Mesoporous Materials 256 (2018) 102-110. Aug. 2017.

Colmenares, M. "Tailoring of ordered mesoporous silica COK-12: Room temperature synthesis of mesocellular foam and multilamellar vesicles." Microporous and Mesoporous Materials 267 (Mar. 13, 2018) 142-149.

De Rogatis et al. "Embedded Phases: A Way to Active and Stable Catalysts." ChemSusChem 3 (2010) 24-42. Dec. 2009.

El-Nahhal, I.M. et al."Synthesis and structural characterization of ZnO and CuO nanoparticle supported mesoporous silica SBA-15." Chem. Physics Letters 667 (2017) 165-171. Nov. 2016.

Fleischer, Vinzenz et al. "Investigation of the role of the Na2WO4/Mn/SiO2 catalyst composition in the oxidative coupling of methane by chemical looping experiments," Journal of Catalysis 360 (2019): 102-117. Feb. 22, 2018.

Hoffmann, F. et al. "Sllica-Based Mesoporous Organic-Inorganic Hybrid Materials." Angew. Chemie Int. Ed. 45 (May 2006): 3216-3251.

Huang, W. et al "Dendrimer Templated Synthesis of One Nanometer Rh and Pt Particles Supported on Mesoporous Silica: Catalytic Activity for Ethylene and Pyrrole Hydrogenation." Nano Letters 8 (7), Jun. 11, 2008. pp. 2027-2034.

Jammaer, J. et al. "Continuous Synthesis Process of Hexagonal Nanoplates of P6m Ordered Mesoporous Silica." J. Am. Chem. Soc. 113 (Jul. 26, 2011) 13737-13745.

Jammaer, J. et al. "Convenient synthesis of ordered mesoporous silica at room temperature and quasi-neutral pH." J. Mater. Chem. 19 (Oct. 6, 2009) 8290-8293.

Jin, J. et al "One-step synthesis of highly ordered Pt/MCM-41 from natural diatomite and the superior capacity in hydrogen storage." Applied Clay Science 99 (Jul. 16, 2014) 246-253.

Karam, L. et al. "Tuning the properties of nickel nanoparticles inside SBA-15 mesopores for enhanced stability in methane reforming " Journal of CO2 Utilization 17 (2017) 119-124. Dec. 2016.

Kaydouh, M.-N. et al. "Effect of the order of Ni and Ce addition in SBA-15 on the activity in dry reforming of methane." C. R. Chimie 18 (Feb. 7, 2015) 293-301.

Kaydouh, M.-N. et al. "Highly active and stable Ni/SBA-15 catalysts prepared by a "two solvents" method for dry reforming of methane." Microporous and Mesoporous Materials 220 (2016) 99-109. Sep. 8, 2015.

(56) References Cited

OTHER PUBLICATIONS

Laribi, M. et al. "Synthesis, characterization and catalytic application of the nickel containing mesoporous silica." J. Assoc. Arab. Univ. Basic Appl. Sci. 12 (May 5, 2012) 42-47.

Lee, S. et al. "Ni/NiO Core/Shell Nanoparticles for Selective Binding and Magnetic Separation of Histidine-Tagged Proteins." J. Am. Chem. Soc. 128 (May 6, 2006) 10658-10659.

Li, B. et al. "Catalytic performance and characterization of Neodymium-containing mesoporous silica supported nickel catalysts for methane reforming to syngas." Int. J. of Hydrogen Energy 42 (Apr. 17, 2017) 12197-12209.

Li, C. et al. "Development of new nickel based catalyst for biomass tar steam reforming producing H2-rich syngas." Fuel Process. Technol. 90 (Feb. 23, 2009) 790-796.

Li, D. "Ceria-promoted Ni/SBA-15 catalysts for ethanol steam reforming withenhanced activity and resistance to deactivation." Appl. Catal. B: Environ. 176 (Apr. 13, 2015) 532-541.

Li, L. et al. "Stabilization of Metal Nanoparticles in Cubic Mesostructured Silica and Its Application in Regenerable Deep Desulfurization of Warm Syngas." Chem. Mater. 21 (May 4, 2009): 5358-5364.

Li, M. "Hydrogen production from ethanol steam reforming over nickel based catalyst derived from Ni/Mg/Al hydrotalcite-like compounds." Int. J. Hydrogen Energy 35 (May 21, 2010) 6699-6708.

Ling, D. et al. "A General Strategy for Site-Directed Enzyme Immobilization by Using NiO Nanoparticle Decorated Mesoporous Silica." Chem. Eur. J. 20 ( Jun. 23, 2014) 7916-21.

Liu, D. et al. "MCM-41 supported nickel-based bimetallic catalysts with superior stability during carbon dioxide reforming of methane: Effect of strong metal-support interaction." J. of Catal. 266 (Aug. 7, 2009) 380-390.

Liu, H. et al. "Preparation, characterization and activities of the nano-sized Ni/SBA-15 catalyst for producing COx-free hydrogen from ammonia." Applied Catalysis A: Gen. 337 (Mar. 2008) 138-147.

Lovell, E.C. et al. "Ni-SiO2 Catalysts for the Carbon Dioxide Reforming of Methane: Varying Support Properties by Flame Spray Pyrolysis." Molecules 20 (Mar. 12, 2015) 4594-4609.

Lu, B. and Kawamoto, K. "Preparation of monodispersed NiO particles in SBA-15, and its enhanced selectivity for reverse water gas shift reaction." J. Environment Chemical Engineering 1 ( May 14, 2013) 300-309.

Lu, B. and Kawamoto, K. "Transition metal-rich mesoporous silicas and their enhanced catalytic properties." Catal. Sci. Technol. 4 (Jul. 22, 2014) 4313-4321.

Lu, B et al. "Dispersion and distribution of bimetallic oxides in SBA-15, and their enhanced activity for reverse water gas shift reaction." Inorg. Chem. Front. 2 (Aug. 2015) 741-748.

Ning, X. et al. "Template-Mediated Ni(II) Dispersion in Mesoporous SiO2 for Preparation of Highly Dispersed Ni Catalysts: Influence of Template Type." ACS Appl. Mater. Interfaces 9 (May 12, 2017) 19335-19344.

Oschatz, M. et al. "Ordered Mesoporous Materials as Supports for Stable Iron Catalysts in the Fischer-Tropsch Synthesis of Lower Olefins." ChemCatChem 8 (Aug. 5, 2016) 2846-2852.

Pakhare, D and Spivey, J. "A review of dry (CO2) reforming of methane over noble metal catalysts." Chem. Soc. Rev. 43 (Fenruary 7, 2014) 7813-7837.

Qui, S. et al. "Simply packaging Ni nanoparticles inside SBA-15 channels by coimpregnation for dry reforming of methane." RSC Adv. 7 (Apr. 20, 2017) 24551-24560.

Regalbuto, J. Ed. Catalyst Preparation: Science and Engineering. CRC Press, Boca Raton: 2007. Dec. 26, 2006.

Rodriguez-Gomez, A. et al. "Nickel Particles Selectively Confined in the Mesoporous Channels of SBA-15 Yielding a Very Stable Catalyst for DRM Reaction." J. Phys. Chem. B 122 (2018) 500-510. Jul. 19, 2017.

Rodriguez-Gomez, A. et al. "Understanding the differences in catalytic performance for hydrogen production of Ni and Co supported on mesoporous SBA-15." Catalysis Today 307 (Jun. 2018) 224-230.

Roosta, Z. et al. "Synthesis and evaluation of NiO@MCM-41 core-shell nanocomposite in the CO2 reforming of methane." J. Porous Mater. 25 (2018) 1135-1145. Nov. 8, 2017.

Scholz, J. et al. "Influence of MgO-modified SBA-15 on the structure and catalytic activity of supported vanadium oxide catalysts." J. Catal. 309 (2014) 105-114.

Singh et al. "Advanced synthesis strategies of mesoporous SBA-15 supported catalysts for catalytic reforming applications: A state-of-the-art review." Applied Catalysis A, General 559 (Apr. 15, 2018) 57.

Taherian, Z. et al. "A comparative study of ZrO2, Y2O3 and Sm2O3 promoted Ni/SBA-15 catalysts for evaluation of CO2/methane reforming performance." Int. J. of Hydrogen Energy 42 (Jun. 7, 2017) 16408-16420.

Teherian, Z. et al. "Promotional effect of samarium on the activity and stability of Ni-SBA-15 catalysts in dry reforming of methane." Microporous and Mesoporous Materials 251 (May 16, 2017) 9.

Tanggamjanavalukul, C. et al. "Deactivation of nickel catalysts in methane cracking reaction: Effect of bimodal meso-macropore structure of silica support." Chem. Engin. J. 262 (Feb. 2015) 364-371.

Tao, M. et al. "Impact of double-solvent impregnation on the Ni dispersion of Ni/SBA-15 catalysts and catalytic performance for the syngas methanation reaction." RSC Adv. 6 (Mar. 31, 2016) 35875-35883.

Tao, M. et al. "Synthesis and characterization of well dispersed nickelincorporatedSBA-15 and its high activity in syngas methanation reaction." Applied Catalysis A: General 516 (Feb. 18, 2016) 127-134.

Tao, M. et al. "Highly dispersed nickel within mesochannels of SBA-15 for CO methanation with enhanced activity and excellent thermostability." Fuel 188 (Jan. 2017) 267-276.

Haoguo Zhu et al., "Coassembly Synthesis of Ordered Mesoporous Silica materials Containing Au Nanoparticles" Langmuir, vol. 19, No. 9, Mar. 25, 2003, pp. 3974-3980, XP055641746.

Katsunori Kosuge et al., "One-Step Preparation of Porous Silica Spheres from Sodium Silicate Using Triblock Copolymer Templating" Chemistry of Materials, vol. 16, No. 21, Oct. 1, 2004, pp. 4181-4186, XP055479848.

Gregor Trimmel et al., "Sol-gel processing of alkoxysilyl-substituted nickel complexes for the preparation of highly dispersed nickel in silica" New Journal of Chemistry, vol. 26, No. 6, May 27, 2002, pp. 759-765, XP055641751.

Sandra Martinex et al., "Highly dispersed nickel and palladium nanoparticle cilica aerogels: sol-gel processing of tethered catalysts in the Mizoroki-Heck reaction", New Journal of Chemisty, vol. 30, No. 7, Jan. 1, 2006, pp. 1093-1097, XP055641752.

Chinese Office Action issued in corresponding application No. 202080034227.1, dated May 29, 2023.

Uson, Laura et al. "VOCs abatement using thick eggshell Pt/SBA-15 pellets with hierarchical porosity," Catalysis Today 227 (May 2014) 179-186.

Wang L. and Yang, R.T. "Increasing Selective CO2 Adsorption on Amine-Grafted SBA-15 by Increasing Silanol Density." Journal of Physical Chemistry C115 (Sep. 26, 2011) 21264-21272.

Wang, L. et al. "A nonenzymatic electrochemical H2O2 sensor based on macroporous carbon/polymer foam/PtNPs electrode." J Mater Sci (May 4, 2018) 53: 10946-10954.

Wang Y. et al. "Yolk-Shell Nanostructured Fe3O4@NiSiO3 for Selective Affinity and Magnetic Separation of His-Tagged Proteins." ACS Appl. Mater. Interfaces 6 (Oct. 10, 2014) 19092-19099.

Wu, Y. et al. "Preparation of hollow nickel silicate nanospheres for separation of His-tagged proteins." Dalton Trans. 43 (2014) 779-783. Sep. 25, 2013.

Yang, H. et al. "One-Step Synthesis of Highly Ordered Mesoporous Silica Monoliths with Metal Oxide Nanocrystals in their Channels." Adv. Funct. Mater. 15 (Jul. 25, 2005) 1377-1384.

(56) References Cited

OTHER PUBLICATIONS

Yang, W. et al. "Interaction mechanism of Ni(NO3)2 6H2O and P123 in preparing highly-dispersed Ni/SBA-15 catalytic materials." Microporous Mesoporous Mater. 228 (Apr. 1, 2016) 174-181.

Yang, W. and He, D. "Role of poly(N-vinyl-2-pyrrolidone) in Ni dispersion forhighly-dispersed Ni/SBA-15 catalyst and its catalytic performance incarbon dioxide reforming of methane." AppL Catal. A: Gen. 524 (Jun. 18, 2016) 94-104.

Yildiz, M. et al. "Silica material variation for the MnxOy-Na2WO4/ SiO2." Appl. Catalysis A: Gen. 525 (Jul. 1, 2016) 168-179.

Yildiz, M. et al. "Enhanced catalytic performance of MnxOy-Na2WO4/SiO2 for the oxidative coupling of methane using an ordered mesoporous silica support." Chem. Commun. 50 (Sep. 26, 2014) 14440-14442.

Zhang, Q. et al. "A sintering and carbon-resistant Ni-SBA-15 catalyst prepared by solid-state grinding method for dry reforming of methane." Journal of CO2 Utilization 17 (Jan. 2017) 10-19.

Zhao, D. et al. "Triblock Copolymer Syntheses of Mesoporous Silica with Periodic 50 to 300 Angstrom Pores." Science 279 (Jan. 23, 1998) 548-552.

Zhao, D. et al. "Nonionic Triblock and Star Diblock Copolymer and Oligomeric Surfactant Syntheses of Highly Ordered, Hydrothermally Stable, Mesoporous Silica Structures." J. Am. Chem. Soc. 120 (Jun. 9, 1998) 6024-6036.

Zhu, J. et al. "High-Surface-Area SBA-15 with Enhanced Mesopore Connectivity by the Addition of Poly(vinyl alcohol)." Chem. Mater. 23 (Mar. 31, 2011) 2062-2067.

Zhu, J. et al. "Facile one-pot synthesis of Pt nanoparticles /SBA-15: an active and stable material for catalytic applications." Energy Environ. Science 4 (Mar. 12, 2011) 2020-2024.

Zhou, Z. and Hartmann, M. "Progress in enzyme immobilization in ordered mesoporous materials and related applications." Chem. Soc. Rev. 42 (Feb. 11, 2013) 3894-3912.

Zubrzycki, R. "Role of Vanadium and Phosphorus in Substituted Keggin-Type Heteropolyoxo Molybdates Supported on Silica SBA-15 in Selective Propene Oxidation." ChemCatChem 7 (Feb. 2015) 1112-1121.

Zubrzycki, R. and Ressler, T. "Influence of pore size of SBA-15 on activity and selectivity of H3[PMo12O40] supported on tailored SBA-15." Microporous Mesoporous Mater. (Apr. 22, 2015) doi: 10.1016/j.micromeso.2015.04.022.

\* cited by examiner

METHOD FOR OBTAINING METAL OXIDES SUPPORTED ON MESOPOROUS SILICA PARTICLES

CROSS-REFERENCE TO A RELATED APPLICATION

This application is a National Phase Patent Application of International Patent Application Number PCT/EP2020/062719, filed on May 7, 2020, which claims priority of European Patent Application Number 19 173 277.5, filed on May 8, 2019.

BACKGROUND

The disclosure relates to a method for obtaining metal oxides supported on mesoporous silica particles.

Metal oxides, in particular metal oxides supported on inorganic porous supports, have applications in sensing, separation, catalysis, and storage, among others applications. Extensive efforts have been made regarding the synthesis and preparation of metal oxides supported on ordered mesoporous silica (OMS) supports, such as the well-known SBA-15 and MCM-41 (Yang, H.; Lu, Q.; Gao, F.; Shi, Q.; Yan, Y.; Zhang, F.; Xie, S.; Tu, B.; Zhao, D. *Adv. Funct. Mater.* 2005, 15 (8), 1377.; Oschatz, M.; Lamme, W. S.; Xie, J.; Dugulan, A. I.; de Jong, K. P. *ChemCatChem* 2016, 8 (17), 2846). The ordered, well-defined porosity of the materials, i.e. $MO_x$@OMS, ensures a greater uniformity of catalyst environments and improved mass transport performances compared to disordered silica materials, such as silica gels. The unique properties of OMS-supported materials, namely high surface area and ordered porosity, result in materials with exceptional performance in comparison to materials prepared on non-ordered silica supports (Colmenares, M. G.; Simon, U.; Yildiz, M.; Arndt, S.; Schomaecker, R.; Thomas, A.; Rosowski, F.; Gurlo, A.; Goerke, 0. *Catal Commun.* 2016, 85, 75).

The synthesis of $MO_x$@OMS has been widely reported. The synthesis/preparation methods can be classified as follows: impregnation techniques; two-solvent impregnation; deposition-precipitation; one-pot synthesis; and functionalization of OMS support.

Wetness impregnation (WI) and incipient wetness impregnation (IWI) are the most widely used techniques for the incorporation of metal species onto OMS supports, due to their simplicity and affordability. Generally, the metal precursor in the form of a salt is dissolved in water and then the OMS support is either mixed into the solution of metal precursor (WI), or a volume of the precursor solution that equals the support pore volume is added dropwise on top of the support—to ensure that the uptake of the metal precursor by the support is as high as possible (IWI). After impregnation, a calcination step follows, forming the metal oxide in the pores of the material. An additional reduction step generates the active metal. The nature and interaction between the precursor solution and support determine the dispersion of the metal surface at the interface of the support. If the metal-support interaction is weak, the metal can agglomerate and not only reduce the dispersion, but also produce pore blockage. Impregnation techniques, although easy and affordable, generally result in the formation of agglomerated particles on the support surface (Tao, M.; Xin, Z.; Meng, X.; Lv, Y.; Bian, Z. *RSC Adv.* 2016, 6 (42), 35875).

To circumvent the issue of non-homogeneous or irregular filling of the pores often observed in traditional impregnation methods, a method called "double-solvent" or "two-solvent" impregnation was proposed (Karam, L.; Casale, S.; El Zakhem, H.; El Hassan, N. *J.CO2 Util.* 2017, 17, 119). Normally it consists of three steps: (i) the metal salt precursor is dissolved in a volume of water equal to the pore volume of the support, as in IWI, (ii) the OMS support is suspended in a non-polar or hydrophobic solvent to form a hydrophobic solution (such as hexane), and (iii) the metal salt precursor solution is added dropwise to the hydrophobic solution. This is followed by calcination in air and then an optional reduction step, the same as for the traditional impregnation methods. Higher metal loadings were observed by using this method, presumably due to an increase in silanol groups on the surface of the OMS support upon the addition of an alkane, which ultimately increases the hydrophilic nature of the support resulting in better interaction with the metal salts and therefore better dispersion. This method of preparation results in higher loadings and better dispersion, but after calcination and reduction, sintering and agglomeration of the particles was still observed. An enhancement of the interaction between the metal and the silanol groups on the surface of the support could reduce this issue.

The deposition-precipitation technique involves the deposition of a solvated metal salt onto the surface of suspended OMS support followed by the controlled addition of an alkaline solution to increase the pH and therefore promote the formation of precipitates of the metal. This technique presents problems in terms of controlling the rate of growth of the precipitated particles—if the growth rate is faster than the nucleation rate, the result is randomly distributed agglomerated particles on the surface of the OMS support.

The one-pot or in-situ synthesis, also called the hydrothermal synthesis method, consists of incorporating the metal salt to the silica precursor solution, i.e. before the formation of the OMS support (in the same "pot"). The idea behind this method is to increase the dispersion of the metal throughout the silica structure, while also eliminating one (or more) preparation steps. However, the direct incorporation of metal precursor salts to the OMS precursor solution is difficult because of the highly acidic (pH<1) conditions that are required for the preparation of the support—the metal salts solubilize and percolate into the acidic media and the resulting $MO_x$@OMS material would contain less metal than the theoretical calculation. Various attempts have been made to circumvent this issue, namely by increasing the pH of the solution. Although higher metal loadings were observed, the characteristic ordering of the pores of the OMS support was significantly decreased, due to the higher pH value. This problem can be circumvented by an additional "capping" step, in which the metal ions are encapsulated with an organic steric stabilizer, followed by a reduction step, and then the incorporation of the reduced capped species into the OMS precursor solution (Huang, W.; Kuhn, J. N.; Tsung, C.-K.; Zhang, Y.; Habas, S. E.; Yang, P.; Somorjai, G. A. *Nano Lett.* 2008, 8 (7), 2027). Both methods described here are followed by the traditional hydrothermal synthesis process, which is essentially prolonged times under high temperature and pressure in order to form the silica structure.

Functionalization of the surface of the OMS support can be carried out in different ways, with the aim to either incorporate new moieties into the silica matrix or to increase the available silanol groups on the silica surface. This generates more anchoring sites that can interact more strongly with the metal and ultimately improve dispersion and reduce agglomeration.

Metal immobilization on template occluded OMS: The formation mechanism of OMS support materials includes the polycondensation of an amorphous silica network around a preformed surfactant micellar network, which acts as a template. This template is removed at a subsequent process step, normally by calcination. However, calcination at high temperature reduces the potential density of silanol groups available on the surface of the OMS support. One way to overcome this is by removing the template with alternate methods, for example solvent extraction. The immobilization of metal precursors inside the micellar template and subsequent removal of the template by alternate methods is therefore a way to increase the dispersion of metals on the OMS surface, due to higher availability of silanol groups. The metal precursor can be incorporated into the uncalcined OMS/template composite by solid-state grinding or by hydrophobic encapsulation, in which the metal precursor is encapsulated in a new surfactant and the OMS support is impregnated once more, and subsequent removal of the surfactant takes place by alternative methods.

Grafting pre-organized ligands and organometallic additives: The design of $MO_x$@OMS materials at the molecular level is at the forefront of materials engineering. Anchoring or grafting of preformed ligands or molecular complexes involves electron sharing or bonding between the metal active center of the structural metal complex and the silanol groups of the OMS support. This technique consists of synthesizing the ligand molecule and then impregnating the OMS support with said molecule.

None of the methods described above can be used to produce high-quality $MO_x$@OMS (i.e. with ordered porosity, high surface areas, and a high dispersion and stable deposition of the metal oxide on the support) in large quantities in an economically viable manner due to the need for high temperatures, toxic solvents, and extended overall synthesis times. As such, $MO_x$@OMS are not currently used on a commercial basis in any large-scale processes.

SUMMARY

In view of the above drawbacks in the large scale production of metal oxide supported mesoporous silica it was an object underlying the proposed solution to provide a process for obtaining metal oxide supported mesoporous silica on a large scale, at low costs and in an environmentally friendly manner that also allows for a continuous synthesis.

This object is solved by a method for obtaining metal oxide supported mesoporous silica particles having features as described herein.

Accordingly, a method for obtaining metal oxides supported on mesoporous silica particles is provided, the method comprising the steps of
a) providing a solution of at least one metal salt, wherein the metal is selected from a group containing Ti, V, Cr, Mn, Fe, Co, Ni, Cu, Zn, Ru, Rh, Pd, Ag, Ir, Pt and Au, preferably V, Fe, Ni, Cu, Ru, Rh, Pd, Ag and Pt, more preferably V, Ni, Ru, Rh, Pd and Pt;
b) providing a solution of at least one complex forming agent, wherein the at least one complex forming agent is of the general formulae (I)

$$Y_3Si(CH_2)_n-X \quad (I)$$

wherein
X is a complexing functional group,
Y is —OH or a hydrolysable moiety selected from the group containing halogen, alkoxy, aryloxy, acyloxy, in particular —OH, -alkoxy,
n is ≥1, in particular ≥2;
c) mixing the metal salt solution of step a) and the complex forming agent solution of step b) to obtain a metal precursor solution with a pH value between 6-12, preferably 8-12, with a functional group X/metal ratio of ≥1;
d) containing at least one pore structure directing agent (SDA) (template) adjusted to a pH range between 2 and 8;
e) mixing the metal precursor solution of step c) and the buffered template solution of step d) to obtain a buffered metal precursor-template-mixture;
f) adding at least one alkali silicate solution to the metal precursor-template-mixture of step d) at room temperature to obtain a silica-supported metal complex, at a pH adjusted to a range between 4 and 8, preferably 5; and
g) calcination of the silica-supported metal complex of step f) under air to obtain the metal oxide supported mesoporous silica particles.

The present method involves a three-step route: 1) synthesis of the metal precursor, 2) synthesis of a silica-supported metal complex, and 3) an oxidative thermal treatment (or calcination) to obtain the metal oxide supported mesoporous silica particles. The second step of the reaction, that is the one-pot synthesis of a supported metal silica complex, opens up a path for a continuous process to achieve the large scale production of the materials. The calcination step of the silica-supported metal complex can be achieved in bulk in large calcination ovens, and therefore does not limit the large-scale production of the materials. The general route for the preparation of metal oxide supported mesoporous silica particles with nickel oxide supported silica particles as example is depicted in FIG. 1.

Thus, a new synthetic method is provided as a one-pot method, which, in addition to having the advantage of fewer overall preparation steps compared to the state of the art, also takes place at a near neutral pH, which circumvents the problems associated with extreme pH environments. Furthermore, the inventive synthesis process is not hydrothermal, i.e. the synthesis takes place at room temperature and pressure, which represents a significant saving in energy, and no need for temperature control. This is especially important if the material is to be synthesized in large scale. Moreover, the formation of the material is instantaneous upon mixing of the reagents—in contrast to the long synthesis times reported in literature for one-pot synthesis methods (often requiring at least 24 hours).

The present method for preparing metal oxide supported on mesoporous silica particles involves the co-condensation of a pre-formed metal precursor, consisting of a metal complex which contains a hydrolysable moiety prone to condensation with a silica source, thus leading to a hybrid material.

The route to produce metal oxide supported on mesoporous silica particles ($MO_x$@OMS) is based on the reactivity of the precursors, which is especially essential for the formation of the silica-supported metal complex. For example, in the synthesis of NiO@OMS, the synthesis of the metal precursor involves the formation of a metal carboxylate complex by using $NiSO_4 \cdot 6H_2O$ as metal salt and carboxyethylsilanetriol (CES) as the complex forming agent:

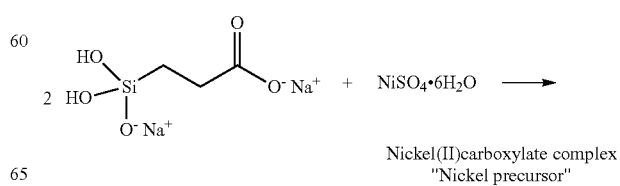

Nickel(II)carboxylate complex
"Nickel precursor"

Micelles are formed by the dissolution of the pore structure directing agent (SDA) such as the triblock copolymer Pluronic P123 in water in buffer system, such as an acetic acid/acetate buffer The addition of the metal precursor solution and the buffered template solution leads to the arrangement of the metal precursor around the micelles. Upon addition of sodium silicate to the reaction mixture, the silica network condenses and polymerizes giving rise to the supported metal silica complex as a mesostructure with hexagonal arrangement. The condensation and polymerization take place at pH 5, which is achieved by pH control using an acetic acid/acetate buffer. Under these reaction conditions, the formation of the silica-supported metal complex takes place immediately, allowing for a potential continuous synthesis. A descriptive image depicting the synthesis of nickel oxide supported mesoporous silicate NiO@OMS as example is shown in FIG. 2.

The present method opens up a new way of synthesizing metal supported mesoporous silica particles ($MO_x$@OMS) with excellent properties (high surface area and pore ordering, good dispersion of metal species), but the metal@OMS are also produced at room temperature, under greener conditions (i.e. using water as the synthesis media instead of organic solvents and at quasi neutral pH), with the additional possibility of continuous synthesis—which ultimately facilitates large-scale production. The present method allows now for a large-scale, low cost and environmentally-friendly synthesis of high-quality metal@OMS.

In an embodiment of the present method the anion of the at least one metal salt may be any of the following: sulfate, nitrate, fluoride, chloride, bromide, iodide, perchlorate, phosphate, pyrophosphate, acetate, acetylacetonate, cyanide, citrate, oxalate, carbonate, tetrafluoroborate, hydroxide and sulfamate.

In a further embodiment of the present method the complex forming agent of general formulae (I) comprises Y wherein Y is —OH, $C_{1-6}$-Alkoxy, in particular Methoxy, Ethoxy, n-Propoxy or Butoxy, $C_{6-10}$-Aryloxy, in particular Phenoxy, $C_{2-7}$-Acyloxy, in particular Acetoxy or Propionoxy. It is to be understood that Y (in $Y_3Si$) is a moiety prone to hydrolysis and condensation with the silica precursors.

In a further embodiment the complexing functional group X is hydroxy (OH), amine (—$NR^2_2$, where $R^2$ can be H or an alkyl chain), imino, urea ((—NH)CO(NH$_2$)), amide (—CONH$_2$), carboxylic acid (—CO$_2$H), carboxylic acid anion (—CO$_2$), sulfonic acid (—SO$_3$H), sulfonic acid anion (—SO$_3$), methanethionic acid (—CS$_2$H), phosphonate (—PO$_3R^3_2$ with $R^3$ is an alkyl chain), phosphonic acid (—PO$_3H_2$), sulfide (—S—), phosphine (—PR$^4_2$, where $R^4$ can be H or an alkyl chain), pyridine, pyrazine, or the like. Moiety X is preferably carboxylic acid (—CO$_2$H) or carboxylic acid anion (—CO$_2$).

Other functional groups may include:

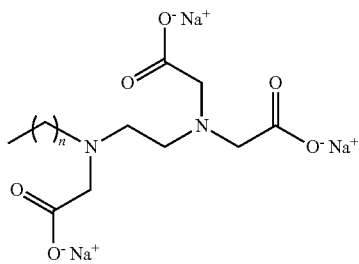

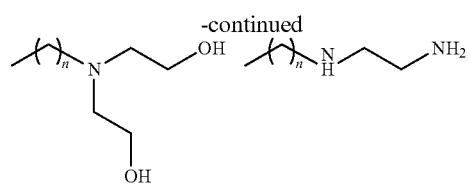

In a more preferred embodiment the at least one complex (or template) forming agent is selected from a group comprising Carboxyethylsilanetriol sodium salt, (3-Aminopropyl)trimethoxysilane, N1-(3-Trimethoxysilylpropyl)diethylenetriamine, N-(2-Aminoethyl)-3-aminopropyl silanetriol, 3-Aminopropylsilanetriol, (N,N-Dimethylaminopropyl)trimethoxysilane, 1-[3-(Trimethoxysilyl)propyl]urea, N-[3-(Trimethoxysilyl)propyl]ethylenediamine, 3-[Bis(2-hydroxyethyl)amino]propyl-triethoxysilane, N-(Trimethoxysilylpropyl)-ethylenediaminetriacetate, tripotassium salt, N-(Trimethoxysilylpropyl)ethylene-diaminetriacetate, tripotassium salt, 3-(Trihydroxysilyl)-1-propanesulfonic acid, (2-diethylphosphatoethyl)triethoxysilane, 3-(trihydroxysilyl)propyl methylphosphonate, Bis[3-(triethoxysilyl)propyl] tetrasulfide, Bis[3-(triethoxysilyl)propyl]disulphide, (2-Dicyclohexylphosphinoethyl)triethoxysilane, 2-(Diphenylphosphino)ethyl-triethoxysilane, 2-(4-pyridylethyl)triethoxysilane, 3-(4-pyridylethyl)thiopropyltrimethoxysilane or (3-Bromopropyl)trimethoxysilane.

The most preferred complex (or template) forming agent are of the following structures:

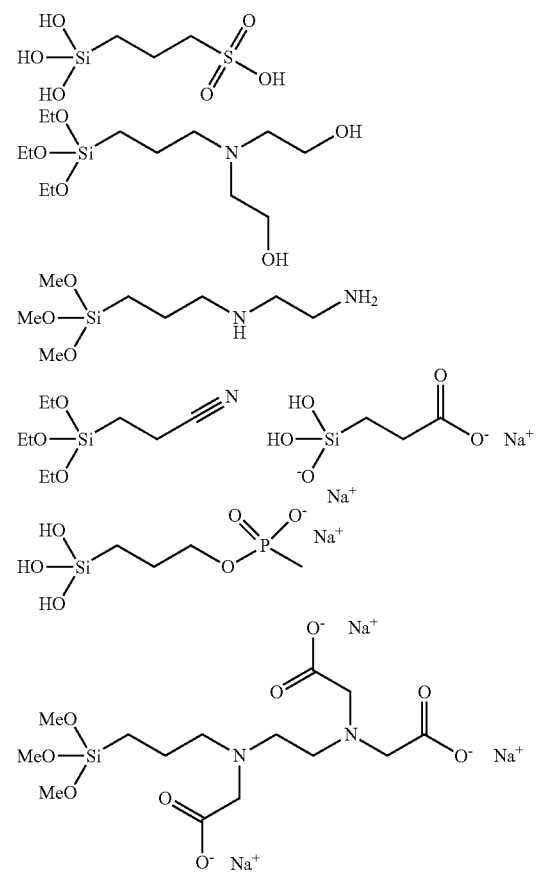

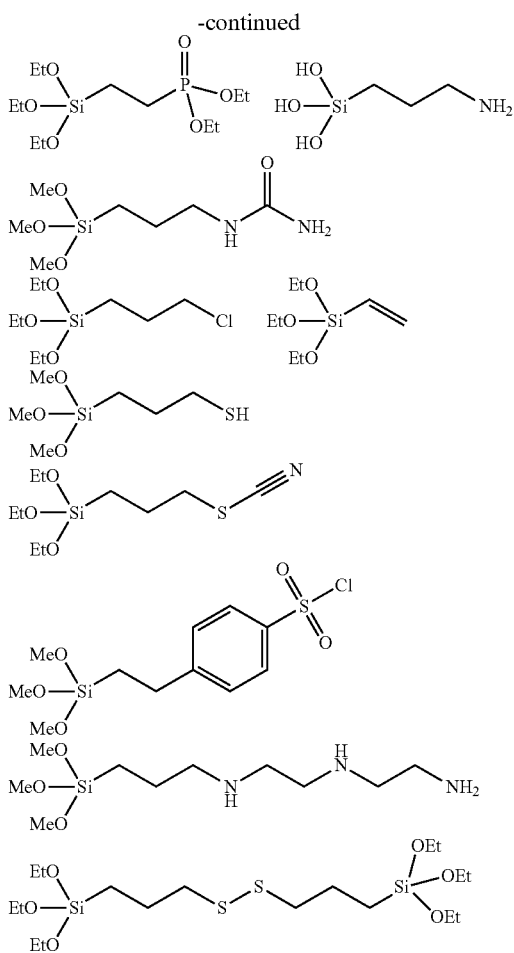

Carboxyethylsilanetriol sodium salt or HO$_3$Si(CH$_2$)$_2$CO$_2$H are in particular preferred as template forming agent.

In a variant of the present method the metal salt and the complex (or template) forming agent are mixed in a molar ratio between 1:6 and 1:1, preferably 1:2. Thus, an excess of template forming agent is preferred. Therefore, functional group/metal ratio is ≥1.

It is furthermore preferred, if the mixture of metal salt and complex forming agent in step c) has a pH value between 6 and 12, preferably between 8 and 12.

In a further embodiment of the present method the at least one pore structure directing agent (SDA) added in step d) is a non-ionic polymeric pore structure directing agent from the group of poly(alkylene oxide)triblock copolymer. It is preferred, if at least one pore structure directing agent is HO(CH$_2$CH$_2$O)$_{20}$(CH$_2$CH(CH$_3$)O)$_{70}$(CH$_2$CH$_2$O)$_{20}$H (Pluronic P123). The pore structure directing agents preferably used in the present process are also known as Poloxamers.

Poloxamers are nonionic triblock copolymers composed of a central hydrophobic chain of polyoxypropylene (poly(propylene oxide)) flanked by two hydrophilic chains of polyoxyethylene (poly(ethylene oxide)). Poloxamers are also known by the trade names Synperonics, Pluronics, and Kolliphor.

Because the lengths of the polymer blocks can be customized, many different poloxamers exist that have slightly different properties. For the generic term "poloxamer", these copolymers are commonly named with the letter "P" (for poloxamer) followed by three digits: the first two digits×100 give the approximate molecular mass of the polyoxypropylene core, and the last digit×10 gives the percentage polyoxyethylene content (e.g. P407=poloxamer with a polyoxypropylene molecular mass of 4,000 g/mol and a 70% polyoxyethylene content). For the Pluronic and Synperonic tradenames, coding of these copolymers starts with a letter to define its physical form at room temperature (L=liquid, P=paste, F=flake (solid)) followed by two or three digits, The first digit (two digits in a three-digit number) in the numerical designation, multiplied by 300, indicates the approximate molecular weight of the hydrophobe; and the last digit×10 gives the percentage polyoxyethylene content (e.g., L61 indicates a polyoxypropylene molecular mass of 1,800 g/mol and a 10% polyoxyethylene content).

In one variant, at least one pore structure directing agent (SDA) is provided in a buffer solution with a pH between 2 and 8, preferably 5 to 7, in step d). Typical buffer solutions are an acetic acid/acetate buffer, a sodium citrate/citric acid buffer, a Na$_2$HPO$_4$/citric acid buffer, a HCl/sodium citrate buffer or a Na$_2$HPO/NaH$_2$PO$_4$ buffer. An acetic acid/acetate or sodium citrate/citric acid buffer are particular preferred. The control of the pH provides quasi-neutral conditions that are critical for the immediate synthesis of the materials (thus allowing synthesis in continuous mode).

In an most preferred embodiment the sodium acetate/acetic acid buffer has a sodium acetate:acetic acid weight ratio in the range of 0.18:1 to 5.6:1. The buffer system may contain 2.26 g acetic acid and 5.67 g sodium citrate.

The above buffer solution, in which the pore structure directing agent is provided, provides also for the buffering system in the reaction mixture.

The concentration of the at least one pore structure directing agent in the buffer solution is between 2 and 10 wt % (based on the total solution), preferably 4 and 8 wt %, more preferably 4 and 5 wt %.

In yet another variant of the present method the metal precursor-template-mixture obtained in step e) is stirred at room temperature for 12-36 h, preferably for 24 h.

This is followed by adding the at least one alkali silica solution to the metal precursor-template-mixture, wherein the at least one alkali silica solution comprises an aqueous sodium silicate solution.

In an embodiment of the present method sodium silicate (Na$_2$SiO$_2$ or Na$_2$SiO$_3$, CAS numbers 1344-09-8 and 6834-92-0, respectively) solution is used. It is preferred, the at least one silica precursor solution comprises the alkali silicate in an amount between 20 and 40 wt %, preferably between 25 and 35 wt %, in particular preferably between 27 and 30 wt % of SiO$_2$, and NaOH in an amount between 5 and 30 wt %, preferably between 10 and 20 wt %, most preferably 14 wt %. In a specific embodiment the silica precursor solution comprises 27 wt % SiO$_2$ and 14 wt % NaOH.

The pH value of the mixture in step f) is adjusted to a range between 4 and 8, preferably 5 using a buffered system. A suitable buffer may be acetic acid/acetate buffer. As mentioned above, it is likewise possible that the buffer solution, in which the pore structuring agent is provided, provides also for the buffering system in the reaction mixture in step f).

In yet a further variant of the present method the supported metal silica complex obtained in step f) is allowed to age for 12 to 48 h, preferably 24 h at a temperature between 20° C. and 100° C., preferably between 20° C. and 60° C., more preferably between 20° C. and 50° C., most preferably between 20° C. and 30° C.

The subsequent calcination of the supported metal silica complex in step g) can be carried out at a temperature between 400 and 800° C., preferably between 500 and 700° C. for 2-12 h, preferably 5-8 h, more preferably 6-7 h.

The immediate formation of the supported metal silica material allows for a potential continuous synthesis.

The set up for conducting the present method in a continuous mode may comprise a synthesis section and a downstream section (see also process flow diagram of FIG. 3).

The synthesis section may comprise at least one feed tank for the silica precursor solution, and at least one feed tank for the mixed buffered solution containing the at least one metal precursor and the at least one pore structure directing agent (SDA).

The synthesis section may comprise furthermore at least one static mixer for mixing the silica precursor solution and the mixed solution of metal precursor and pore structure directing agent.

The downstream section comprises the devices and apparatus required for aging, separating, drying and calcination. Specifically, the downstream section comprises at least one aging tank, at least one filter unit for separating the silica-supported metal complex and at least one calcination unit for calcination of the silica-supported metal complex to obtain the metal oxide supported on mesoporous silica particles.

The downstream section may further comprise at least one washing liquid tank for providing washing liquid such as water for washing the supported metal silica complex filtered off the in the filter unit and at least one wastewater tank for collecting the waste washing liquid leaving the first filter unit.

It is to be understood that the feeds and suspensions are transported in the synthesis section and downstream section using appropriate pumps.

The continuous process in the synthesis section and downstream section may comprise the following steps according to a first embodiment:
a) Providing at least one silica precursor solution in a first feed tank;
b) Providing at least one buffered solution containing at least one metal salt, at least one complex forming agent of general formulae (I) and at least one pore structure directing agent (SDA) in a second tank;
c) mixing a feed of both solutions from the first feed tank and the second feed tank in a static mixer,
d) optionally transferring a slurry or suspension of the supported metal silica complex to an aging tank;
e) filtrating off, washing and drying the silica-supported metal complex; and
f) calcination of the silica-supported metal complex to obtain the metal oxide supported on mesoporous silica particles.

The present method allows the fast synthesis of metal supported silica complex that takes place at room temperature and quasi-neutral conditions which leads to the instant precipitation of the material. Therefore, a material that is the precursor to a metal oxide supported mesoporous silica structure can be synthesized under milder reaction conditions and faster reaction times that, in contrast to current methodologies, can be produced in continuous mode. This results in relevant improvements over the prior art.

1) Better distribution of the metal oxide: The one-pot synthesis of the supported metal complex allows for a homogenous distribution of metal centers, leading to well distributed oxide species upon calcination. This is not observed for methodologies using impregnation techniques or thermal treatments at higher temperatures, where large particles of metal oxide are observed that lead to a decrease of pore size and a reduced reactivity in certain applications.

2) Higher production capacity: The implementation of a continuous synthesis of the supported metal complex enables an upscaled production and thus avoid batch-to-batch variations in product quality in contrast to current state of the art methods. A continuous synthesis allows the production of material in a kilograms/day capacity with a suitable production unit. This, in contrast to the current methodologies, represents a feasible route for an upscaled production capability. The calcination step of the supported metal complex can be achieved in bulk in large calcination ovens in a reproducible manner, and therefore it does not limit the large-scale production potential.

3) Faster reaction times: The instant formation of the supported metal complex material can be translated into less energy consumption, reduced labor production costs and an overall reduced manufacturing time.

4) Competitive production cost: The present method does not require the use of hydrothermal treatments, as the formation of the supported metal complex takes place immediately at room temperature. Therefore, the large scale production of metal oxide supported mesoporous silica particles can be estimated to have a very competitive price in the silica-supported metals market.

The object is also solved by metal oxide supported on mesoporous silica particles obtained in a method as described above.

The metal oxide supported mesoporous silica particles obtained in a method as described above can be used as affinity material for enzyme purification, for enzyme immobilisation, or as catalyst.

For example, nickel oxide supported on mesoporous silica (NiO@OMS) materials are useful as his-tag affinity materials, and can now be produced at a fraction of the price of his-tag affinity agarose gels. Their high stability in a range of chemical conditions furthermore makes them suitable for the purification and immobilization of enzymes for use in biocatalytic reactions. Indeed, OMS materials have been widely employed as supports for the immobilization of enzymes (Zhou, Z.; Hartmann, M. *Chem. Soc. Rev.* 2013, 42 (9), 3894.).

NiO@OMS has been largely investigated as catalyst for the carbon dioxide (dry) reforming of methane (DRM) in the last decade. The capacity of this reaction to consume the most destructive greenhouse gases ($CO_2$ and $CH_4$) to produce synthesis gas ($H_2$ and CO) according to the following equation $CH_4+CO_2 \rightarrow 2H_2+2CO$ makes it a possible solution to some of the key anthropogenic issues facing society. Synthesis gas (syngas) can be used to produce liquid fuels such as methanol or diesel and thus allow a transition to a more sustainable future.

NiO@OMS can provide a viable option as catalyst for the DRM since Ni shows good activity, selectivity and stability while being economically more interesting than noble metal based catalysts. The use of highly structured, mesoporous supports facilitate small Ni size with high dispersion which ultimately results in a more active, stable catalyst.

Similarly, Ni-based mesoporous silica can also be used as catalysts for biomass tar steam reforming producing Hz-rich gas (Li, C.; Hirabayashi, D.; Suzuki, K. *Fuel Process. Technol.* 2009, 90 (6), 790) or ethanol steam reforming (Li, M.; Wang, X.; Li, S.; Wang, S.; Ma, X. *Int. J. Hydrogen Energy* 2010, 35 (13), 6699).

Furthermore, NiO-based OMS show a wide range of applications as catalyst: e.g. for the benzylation (alkylation)

of benzene as well as for larger molecules like naphthenic compounds such as methylnaphthalene (Laribi, M.; Bachari, K.; Chebout, R.; Touati, M. *J. Assoc. Arab Univ. Basic Appl. Sci.* 2012, 12 (1), 42) and the synthesis of substituted benzimidazole, benzoxazole and benzothiazole with nickel oxide nanorods (Bhosale, M. A.; Bhanage, B. M. *Adv. Powder Technol* 2015, 26 (2), 422).

BRIEF DESCRIPTION OF THE DRAWINGS

In the following the proposed solution is explained in more detail by means of the example with reference to the Figures.

DETAILED DESCRIPTION

Figure 1:
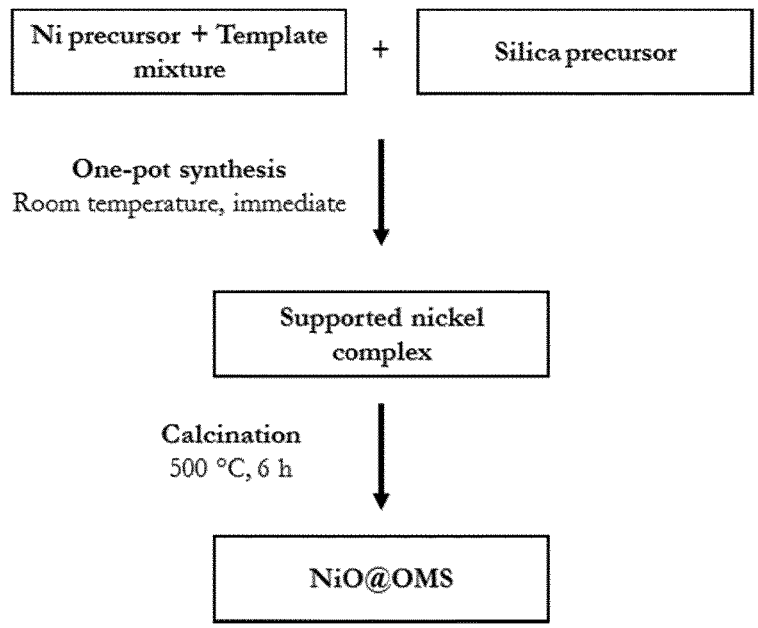
FIG. 1 shows a scheme of a general route for the preparation of nickel oxide supported ordered mesoporous silica as one embodiment of the present method.
Figure 2:
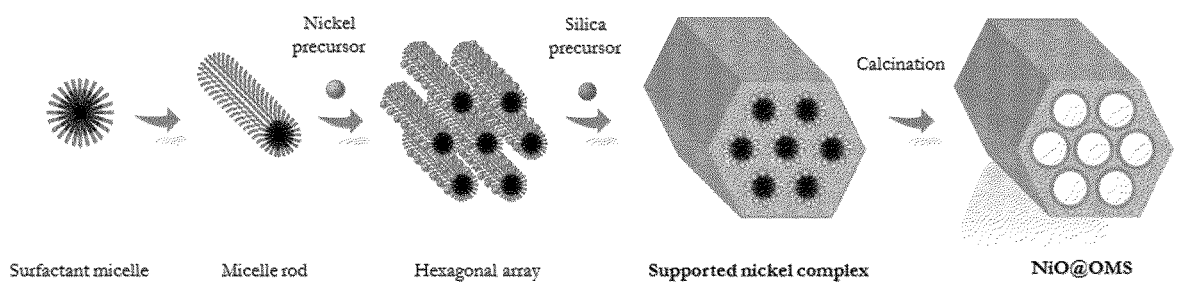
FIG. 2 shows a schematic representation of the steps involved in the synthesis of nickel oxide supported ordered mesoporous silica as one embodiment of the present method.

In the following the process steps of the present method are described in more detail for the synthesis of nickel oxide supported mesoporous silica. FIGS. 1 and 2 depict the general route for the preparation of NiO@OMS.

The supported nickel complex is formed via a one-pot synthesis that takes place immediately at room temperature. The synthesis is based on the condensation of the inexpensive sodium silicate precursor and a nickel precursor using a triblock copolymer as a structure directing agent (hereby referred to as the template) under quasi-neutral conditions.

The formation of the nickel precursor takes place using a silanetriol-functionalised ligand of the general formulae (I) able to form a nickel(II) carboxylate complex. The formed supported nickel complex is calcined at 500° C. under air to remove all the organics (template and functional groups), leading to the deposition of well-distributed nickel(II) oxide species on the surface of the mesoporous silica support.

The one-pot synthesis of the supported nickel complex takes place in water under adequate pH conditions. The precursor solutions require an optimal pH to achieve (1) a maximal loading of nickel, and (2) fast condensation of the silica and nickel precursors. The nickel precursor, which is prepared by reaction of nickel(II) sulfate hexahydrate ($NiSO_4 \cdot 6H_2O$) and disodium salt of carboxyethylsilanetriol (herein CES) according to formulae (I) in water, has a pH in the range of 8-12, which ensures a complete stoichiometric reaction between the reactants in a CES:Ni molar ratio of 2:1.

On the other hand, the fast condensation of the silica precursor, sodium silicate, and the nickel precursor takes place at a pH~5, for which an acetic acid/acetate buffer is used.

The condensation of the precursors in such a short time leads to a material with well-dispersed nickel species, which upon calcination leads to a final material with desirable physical properties (high surface area, large pore size, high pore volume, well-dispersed nickel oxide species).

Figure 3:
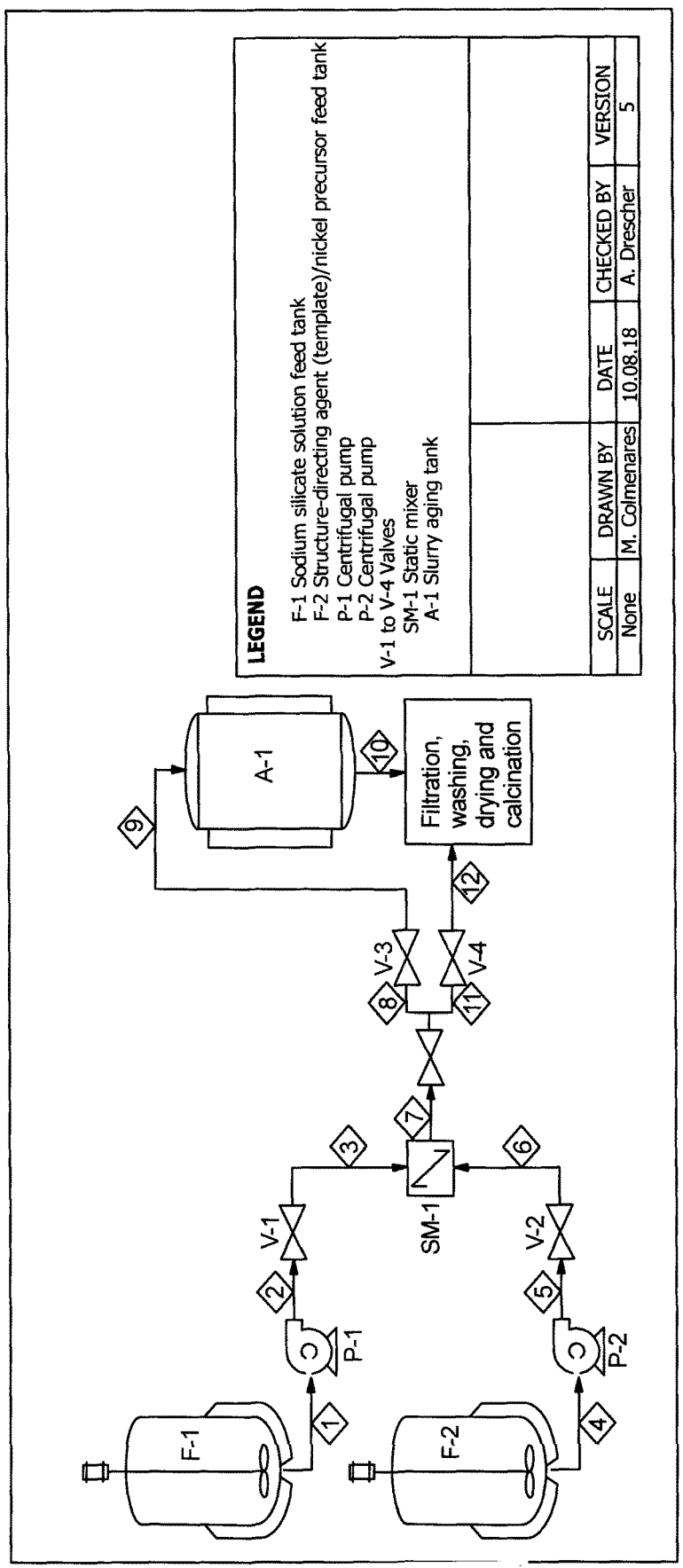
FIG. 3 shows a process flow diagram for the continuous production of silica-supported nickel complex.

The scheme of FIG. 3 provides a conceptual process flow diagram for a continuous production of supported metal silica complex. The set up comprise a synthesis section (left side) and a downstream section (right side).

The synthesis section comprises one feed tank F-1 for the silica precursor solution, and a second feed tank F-2 for the mixed solution containing the metal salt, the complex forming agent and the at least one pore structure directing agent (SDA).

The synthesis section comprises furthermore the static mixers SM-1 for mixing both of the solutions.

The downstream section comprises the devices and apparatus required for aging, separating, drying and calcination. Specifically, the downstream section comprises aging tank A-1, a filter unit for separating the silica-supported metal complex, a washing unit, a drying unit and a calcination unit for calcination of the silica-supported metal complex to obtain the metal oxide supported on mesoporous silica particles.

Pumps P-1, P-2 are used for transporting the feeds and suspensions in the synthesis section and downstream section.

EXPERIMENTAL SECTION

Example 1

2 g of P123 were dissolved in 54 g of deionized water (DIW). To this solution, 2.26 g of acetic acid and 5.67 g of anhydrous sodium acetate were added and the solution was stirred. 0.77 g (2.9 mmol Ni) of nickel(II) sulfate hexahydrate were dissolved in 20 g of DIW, and 4.58 g (5.8 mmol Si) of a solution of the disodium salt of carboxyethylsilanetriol (25 wt % in water) were added and the mixture was stirred. After one hour of stirring, both solutions were mixed and the resulting solution was stirred for 24 h at room temperature.

After this time, 5.20 g (23.4 mmol Si) of a solution of sodium silicate (27% $SiO_2$, 10% NaOH) were added to 15 g of DIW, and the resulting solution was added to the nickel-carboxyethylsilanetriol-template mixture, leading to the instant formation of a green precipitate. The reaction mixture was stirred for 5 minutes, and then aged under static conditions for 24 h.

The solid material was filtered under vacuum and washed with 500 g of DIW. The material was then dried at 80° C. for 12 hours. Finally, the material was calcined at 500° C. for 6 h using a temperature ramp of 5° C./min.

Figure 4:
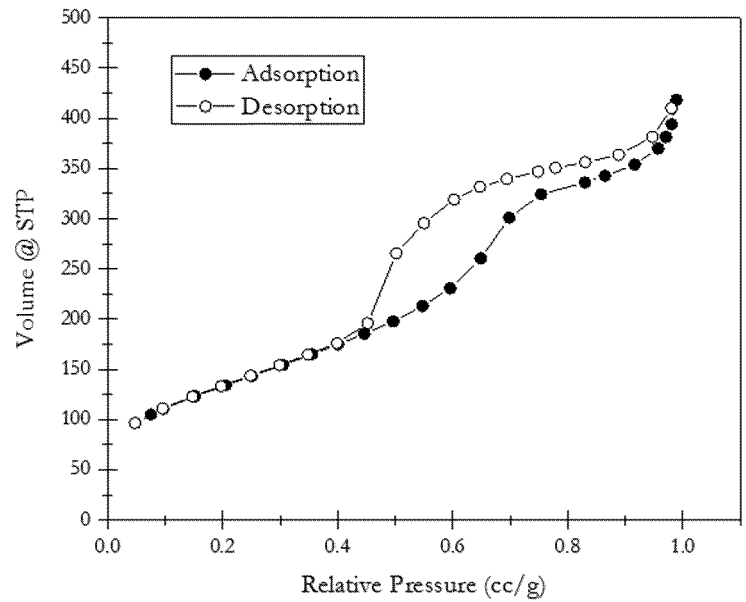
FIG. 4 shows Adsorption-desorption isotherm of the nickel oxide supported on ordered mesoporous silica obtained by the present method.

The calcined material was characterized by nitrogen physisorption to obtain information about the pore structure and properties of the material. The adsorption-desorption isotherm, shown in FIG. 4, can be classified as type IV, according to the IUPAC classification, and has a type-I hysteresis loop, typical of mesoporous materials with uniform pore structure.

Figure 5:
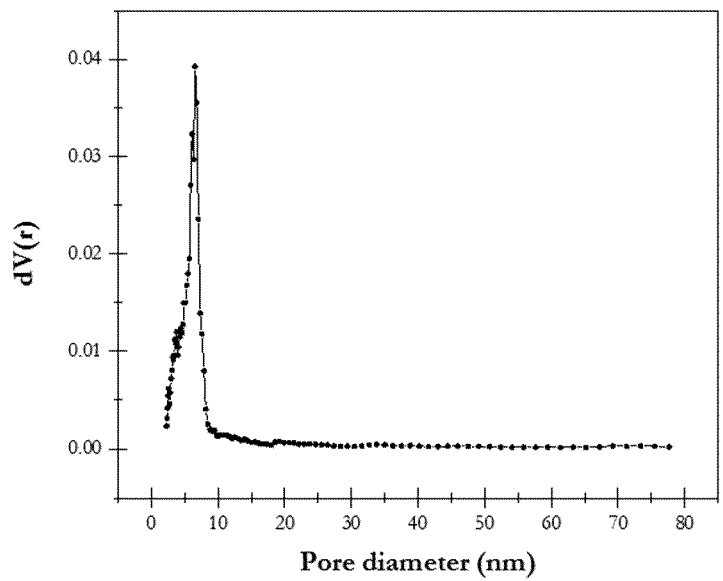
FIG. 5 shows pore size distribution of the nickel oxide supported on ordered mesoporous silica obtained by the present method.

The pore size distribution was calculated using the DFT model using the adsorption branch of the isotherm. A narrow pore size distribution is observed in FIG. 5, with a maxima at 6.5 nm.

From the adsorption-desorption isotherm, the total surface area was calculated using the BET model, and the pore size distribution using the DFT model using the adsorption branch. The data is presented in Table 1.

TABLE 1

Physical properties of the NiO@OMS material.

| | Total surface area (m2/g) | Pore diameter (nm) | Pore volume (ml/g) |
|---|---|---|---|
| NiO@OMS | 485.7 | 6.5 | 0.65 |

The NiO@OMS was also characterized by powder X-ray diffraction. The small-angle X-ray diffraction pattern shows the presence of the (100) diffraction peak at 0.98° typical of 2D hexagonal mesostructures, such as SBA-15 or COK-12.

The wide-angle X-ray diffraction analysis reveals the broad pattern typical of the amorphous silica matrix. There is no presence of diffraction peaks associated to large nanoparticles of NiO or any other species, which indicates the well-distributed nature of the NiO species as a 2D sub-monolayer.

Figure 6:
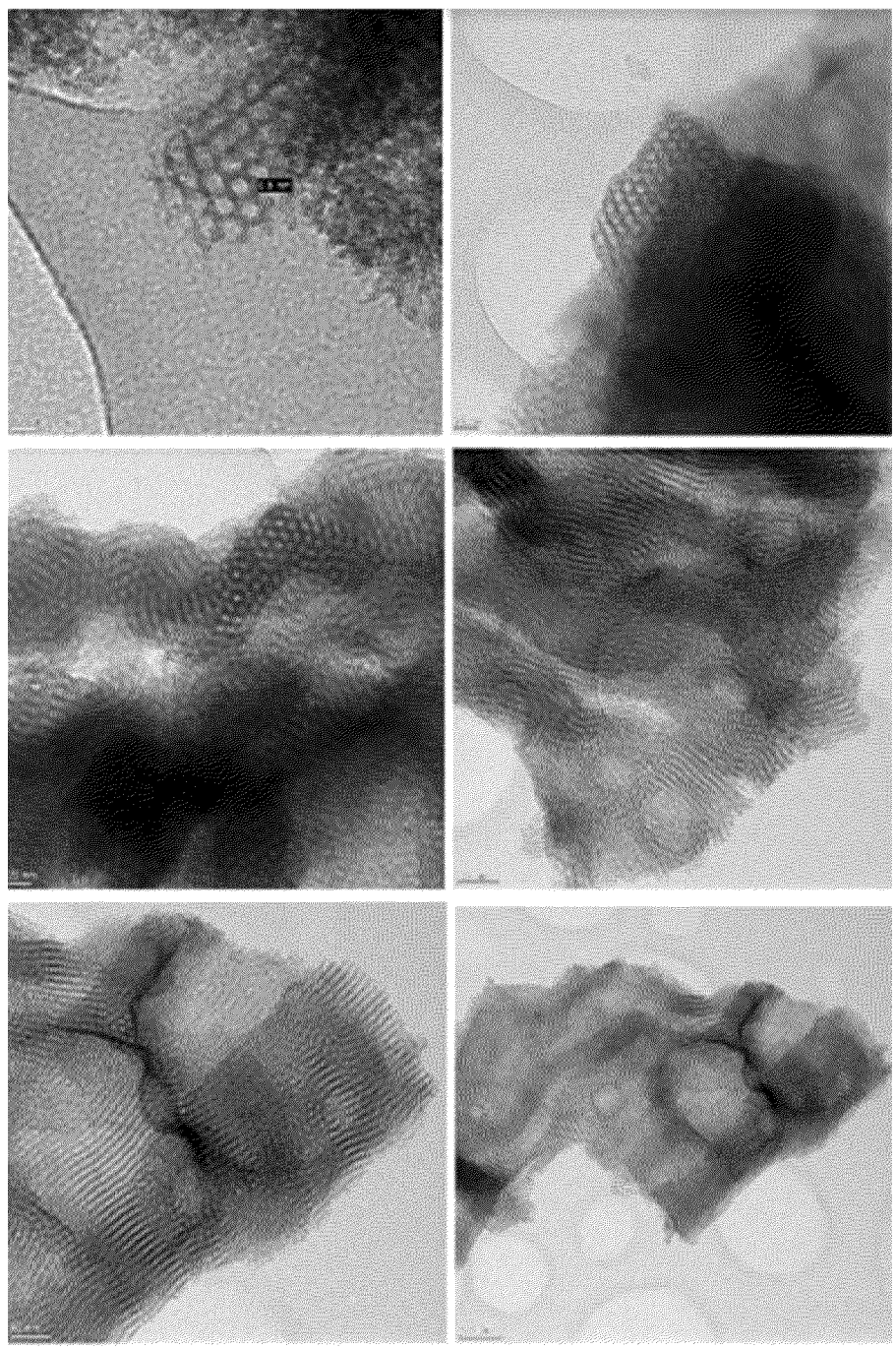
FIG. 6 shows transmission electron microscopy images of the nickel oxide supported on ordered mesoporous silica obtained by the present method.

The NiO@OMS material was also characterized by transmission electron microscopy. From the recorded TEM images, shown in FIG. 6, a cylindrical pore structure can be observed, typical for hexagonal mesostructures of the type of SBA-15 or COK-12. A pore diameter of 6.5 nm was measured from a recorded image in the perpendicular direction to the pore axis, which is consistent with data obtained by N2 physisorption analysis. The deposition of nickel oxide on the surface of the silica support did not lead to a collapse of the ordered structured, which was also revealed by SAXRD and N2 physisorption analysis. The presence of large nanoparticles encapsulated inside the pores is not observed even at the largest magnification, which confirms that nickel oxide exists as a well-dispersed layer on the surface of the silica matrix.

Point EDX analysis was carried out during the TEM measurement, and the presence of Ni, O and Si was confirmed.

The material was also characterized by diffuse reflectance UV-vis spectroscopy. Compared to bulk NiO, the spectrum of the NiO@OMS material do not show the presence of absorption bands in the visible region (Liu, D.; Quek, X. Y.; Cheo, W. N. E.; Lau, R.; Borgna, A.; Yang, Y. *J. Catal.* 2009, 266 (2), 380), which further indicates the absence of large 3D nanoparticles, further supporting the observations clone by wide-angle X-ray diffraction. Instead, the presence of NiO as well-dispersed species is expected. The presence of absorption bands in the UV region suggests that all the nickel centers exist in a distorted tetrahedral environment, possibly by forming —O—Ni—O—Si—O— bonds, as previously suggested (Lu, B.; Kawamoto, K. *Catal. Sci. Technol.* 2014, 4 (12), 4313).

Example 2

2 g of P123 were dissolved in 54 g of deionized water (DIW). To this solution, 2.26 g of acetic acid and 5.67 g of anhydrous sodium acetate were added and the solution was stirred. 0.73 g (1.93 mmol Al) of aluminum nitrate nonahydrate ($Al(NO_3)_3 \cdot 9H_2O$) were dissolved in 20 g of DIW, and 4.58 g (5.8 mmol Si) of a solution of the disodium salt of carboxyethylsilanetriol (25 wt % in water) were added and the mixture was stirred. After one hour of stirring, both solutions were mixed and the resulting solution was stirred for 24 h at room temperature.

After this time, 5.20 g (23.4 mmol Si) of a solution of sodium silicate (27% SiO2, 10% NaOH) were added to 15 g of DIW, and the resulting solution was added to the aluminium-carboxyethylsilanetriol-template mixture, leading to the instant formation of a white precipitate. The reaction mixture was stirred for 5 minutes, and then aged under static conditions for 24 h The solid material was filtered under vacuum and washed with 500 g of DIW. The material was then dried at 80° C. for 12 hours. Finally, the material was calcined at 500° C. for 6 h using a temperature ramp of 5° C./min.

Example 3

2 g of P123 were dissolved in 54 g of deionized water (DIW). To this solution, 2.26 g of acetic acid and 5.67 g of anhydrous sodium acetate were added and the solution was stirred. 0.54 g (2.9 mmol Cu) of copper(II) nitrate hemi (pentahydrate) ($Cu(NO_3)_2 \cdot xH_2O$) were dissolved in 20 g of DIW, and 4.58 g (5.8 mmol Si) of a solution of the disodium salt of carboxyethylsilanetriol (25 wt % in water) were added and the mixture was stirred. After one hour of stirring, both solutions were mixed and the resulting solution was stirred for 24 h at room temperature.

After this time, 5.20 g (23.4 mmol Si) of a solution of sodium silicate (27% SiO2, 10% NaOH) were added to 15 g of DIW, and the resulting solution was added to the copper-carboxyethylsilanetriol-template mixture, leading to the instant formation of a blue-green precipitate. The reaction mixture was stirred for 5 minutes, and then aged under static conditions for 24 h.

The solid material was filtered under vacuum and washed with 500 g of DIW. The material was then dried at 80° C. for 12 hours. Finally, the material was calcined at 500° C. for 6 h using a temperature ramp of 5° C./min.

Example 4

2 g of P123 were dissolved in 54 g of deionized water (DIW). To this solution, 2.26 g of acetic acid and 5.67 g of anhydrous sodium acetate were added and the solution was stirred. 0.84 g (2.9 mmol Co) of cobalt(II) nitrate hexahydrate ($Co(NO_3)_2 \cdot 6H_2O$) were dissolved in 20 g of DIW, and 4.58 g (5.8 mmol Si) of a solution of the disodium salt of carboxyethylsilanetriol (25 wt % in water) were added and the mixture was stirred. After one hour of stirring, both solutions were mixed and the resulting solution was stirred for 24 h at room temperature.

After this time, 5.20 g (23.4 mmol Si) of a solution of sodium silicate (27% SiO2, 10% NaOH) were added to 15 g of DIW, and the resulting solution was added to the cobalt-carboxyethylsilanetriol-template mixture, leading to the instant formation of a pink precipitate. The reaction mixture was stirred for 5 minutes, and then aged under static conditions for 24 h.

The solid material was filtered under vacuum and washed with 500 g of DIW. The material was then dried at 80° C. for 12 hours. Finally, the material was calcined at 500° C. for 6 h using a temperature ramp of 5° C./min.

Example 5

2 g of P123 were dissolved in 54 g of deionized water (DIW). To this solution, 2.26 g of acetic acid and 5.67 g of anhydrous sodium acetate were added and the solution was stirred. 1.17 g (2.9 mmol Fe) of iron(III) nitrate nonahydrate ($Fe(NO_3)_3 \cdot 9H_2O$) were dissolved in 20 g of DIW, and 4.58 g (5.8 mmol Si) of a solution of the disodium salt of carboxyethylsilanetriol (25 wt % in water) were added and the mixture was stirred. After one hour of stirring, both solutions were mixed and the resulting solution was stirred for 24 h at room temperature.

After this time, 5.20 g (23.4 mmol Si) of a solution of sodium silicate (27% SiO2, 10% NaOH) were added to 15 g of DIW, and the resulting solution was added to the iron-carboxyethylsilanetriol-template mixture, leading to the instant formation of a brown precipitate. The reaction mixture was stirred for 5 minutes, and then aged under static conditions for 24 h.

The solid material was filtered under vacuum and washed with 500 g of DIW. The material was then dried at 80° C. for 12 hours. Finally, the material was calcined at 500° C. for 6 h using a temperature ramp of 5° C./min.

Example 6

2 g of P123 were dissolved in 54 g of deionized water (DIW). To this solution, 2.26 g of acetic acid and 5.67 g of anhydrous sodium acetate were added and the solution was stirred. 0.52 g (1.45 mmol Zr) of zirconium(IV) sulfate tetrahydrate (Zr(SO4)2·4H2O) were dissolved in 20 g of DIW, and 4.58 g (5.8 mmol Si) of a solution of the disodium salt of carboxyethylsilanetriol (25 wt % in water) were added and the mixture was stirred. After one hour of stirring, both solutions were mixed and the resulting solution was stirred for 24 h at room temperature.

After this time, 5.20 g (23.4 mmol Si) of a solution of sodium silicate (27% SiO2, 10% NaOH) were added to 15 g of DIW, and the resulting solution was added to the zirconium-carboxyethylsilanetriol-template mixture, leading to the instant formation of a light yellow precipitate. The reaction mixture was stirred for 5 minutes, and then aged under static conditions for 24 h.

The solid material was filtered under vacuum and washed with 500 g of DIW. The material was then dried at 80° C. for 12 hours. Finally, the material was calcined at 500° C. for 6 h using a temperature ramp of 5° C./min.

Example 7

2 g of P123 were dissolved in 54 g of deionized water (DIW). To this solution, 2.26 g of acetic acid and 5.67 g of anhydrous sodium acetate were added and the solution was stirred. 0.77 g (2.9 mmol Pd) of palladium(II) nitrate dihydrate (Pd(NO3)2·2H2O) were dissolved in 20 g of DIW, and 4.58 g (5.8 mmol Si) of a solution of the disodium salt of carboxyethylsilanetriol (25 wt % in water) were added and the mixture was stirred. After one hour of stirring, both solutions were mixed and the resulting solution was stirred for 24 h at room temperature.

After this time, 5.20 g (23.4 mmol Si) of a solution of sodium silicate (27% SiO2, 10% NaOH) were added to 15 g of DIW, and the resulting solution was added to the palladium-carboxyethylsilanetriol-template mixture, leading to the instant formation of a brown precipitate. The reaction mixture was stirred for 5 minutes, and then aged under static conditions for 24 h.

The solid material was filtered under vacuum and washed with 500 g of DIW. The material was then dried at 80° C. for 12 hours. Finally, the material was calcined at 500° C. for 6 h using a temperature ramp of 5° C./min.

The invention claimed is:

1. A method for preparing metal oxides supported on mesoporous silica particles comprising the steps of:

a) providing a solution of at least one metal salt, wherein the metal is selected from a group consisting of Ti, V, Cr, Mn, Fe, Co, Ni, Cu, Zn, Ru, Rh, Pd, Ag, Ir, Pt and Au;
b) providing a solution of at least one complex forming agent, wherein the at least one complex forming agent is of the general formulae (I)

wherein:
X is a complexing functional group,
Y is —OH or a hydrolysable moiety selected from the group consisting of halogen, alkoxy, aryloxy, and acyloxy, and
n is ≥1;
c) mixing the metal salt solution of step a) and the complex forming agent solution of step b) to obtain a metal precursor solution with a pH value between 6-12, which functional group/metal ratio is ≥1;
d) adding a buffered solution containing at least one pore structure directing agent (SDA) (or template) adjusted to a pH range between 2 and 8;
e) mixing the metal precursor solution of step c) and the buffered template solution of step d) to obtain a buffered metal precursor-template-mixture;
f) adding at least one alkali silicate solution to the metal precursor-template
mixture of step d) at room temperature to obtain a silica-supported metal complex, at a pH adjusted to a range between 4 and 8; and
g) calcining of the silica-supported metal complex of step f) under air to obtain the supported metal oxide mesoporous silica particles.

2. The method according to claim 1, wherein Y is —OH, $C_{1-6}$-Alkoxy, $C_{6-10}$-Aryloxy, or $C_{2-7}$-Acyloxy.

3. The method according to claim 1, wherein X is hydroxy (OH), amine (—$NR^2_2$, where $R^2$ is H or an alkyl chain), imino, urea (—NH)CO(NH$_2$)), amide (—CONH$_2$), carboxylic acid (—CO$_2$H), carboxylic acid anion (—CO$_2$), sulfonic acid (—SO$_3$H), sulfonic acid anion (—SO$_3$), methanethionic acid (—CS$_2$H), phosphonate (—PO$_3$R$^3_2$ with $R^3$ is an alkyl chain), phosphonic acid (—PO$_3$H$_2$), sulfide (—S—), phosphine (—PR$^4_2$, where $R^4$ is H or an alkyl chain), pyridine, or pyrazine.

4. The method according to claim 1, wherein the at least one complex forming agent of general formulae (i) is selected from a group comprising Carboxyethylsilanetriol sodium salt, (3-Aminopropyl)trimethoxysilane, N1-(3-Trimethoxysilylpropyl)diethylenetriamine, N-(2-Aminoethyl)-3-aminopropylsilanetriol, 3-Aminopropylsilanetriol, (N,N-Dimethylaminopropyl)trimethoxysilane, 1-[3-(Trimethoxysilyl)propyl]urea, N-[3-(Trimethoxysilyl)propyl]ethylenediamine, 3-[Bis(2-hydroxyethyl) amino]propyltriethoxysilane, N-(Trimethoxysilylpropyl)-ethylenediaminetriacetate, tripotassium salt, N-(Trimethoxysilylpropyl) ethylene-diaminetriacetate, tripotassium salt, 3-(Trihydroxysilyl)-1-propanesulfonic acid, (2-diethylphosphatoethyl) triethoxysilane, 3-(trihydroxysilyl)propyl methylphosphonate, Bis[3-(triethoxysilyl) propyl]tetrasulfide, Bis[3-(triethoxysilyl)propyl]disulphide, (2-Dicyclohexylphosphinoethyl) triethoxysilane, 2-(Diphenylphosphino)ethyl-triethoxysilane, 2-(4-pyridylethyl) triethoxysilane, 3-(4-pyridylethyl)thiopropyltrimethoxysilane and (3-Bromopropyl)trimethoxysilane.

5. The method according to claim 1, wherein the metal salt and the complex forming agent are mixed in a ratio ≥1.

6. The method according to claim 1, wherein the at least one pore structure directing agent (SDA) or template is a non-ionic polymeric pore structure directing agent.

7. The method according to claim 1, wherein the SDA or template is dissolved in a buffered solution adjusted to a pH range between 2 and 8.

8. The method according to claim 1, wherein the metal precursor-template-mixture obtained in step d) is stirred at room temperature for 12-36 h.

9. The method according to claim 1, wherein the at least one alkali silica solution comprises an aqueous sodium silicate solution.

10. The method according to claim 1, wherein the at least one alkali silica solution comprises the alkali silicate in an amount between 20 and 40 wt % based on the total solution.

11. The method according to claim 1, wherein in step f) the pH of the mixture is adjusted to a range between 4 and 8 in a buffered system.

12. The method according to claim 1, wherein the buffer system is composed of acetic acid/sodium acetate, sodium citrate/citric acid, $Na_2HPO_4$/citric acid, HCl/sodium citrate or $Na_2HPO$/$NaH_2PO_4$.

13. The method according to claim 1, wherein the silica-supported metal complex obtained in step f) is allowed to age for 12 to 48 h at a temperature between 20° C. and 100° C.

14. The method according to claim 1, wherein the calcination of the supported metal silica complex in step g) is carried out at a temperature between 40° and 800° C. for 2-12 h.

15. The method according to claim 1, wherein the metal oxide is used as affinity material for enzyme purification, enzyme immobilization, or catalyst.

* * * * *